(12) United States Patent
Ego

(10) Patent No.: US 8,711,208 B2
(45) Date of Patent: Apr. 29, 2014

(54) IMAGING DEVICE, METHOD AND COMPUTER READABLE MEDIUM

(71) Applicant: FUJIFILM Corporation, Tokyo (JP)

(72) Inventor: Shunta Ego, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/901,628

(22) Filed: May 24, 2013

(65) Prior Publication Data

US 2013/0258065 A1    Oct. 3, 2013

Related U.S. Application Data

(63) Continuation of application No. PCT/JP2011/073856, filed on Oct. 17, 2011.

(30) Foreign Application Priority Data

Dec. 24, 2010    (JP) ................. 2010-288749

(51) Int. Cl.
*H04N 13/02*    (2006.01)

(52) U.S. Cl.
USPC ............................................. 348/47

(58) Field of Classification Search
USPC ............................................. 348/47
See application file for complete search history.

(56) References Cited

U.S. PATENT DOCUMENTS

2009/0244268 A1 * 10/2009 Masuda et al. ............... 348/51

FOREIGN PATENT DOCUMENTS

| JP | 2-100589 A | 4/1990 |
|---|---|---|
| JP | 10-32840 A | 2/1998 |
| JP | 2004-221700 A | 8/2004 |
| JP | 2005-142819 A | 6/2005 |
| JP | 2008-103820 A | 5/2008 |
| JP | 2009-239388 A | 10/2009 |

OTHER PUBLICATIONS

International Search Report Issued in PCT/JP2011/073856 mailed on Jan. 17, 2012.
Written Opinion Issued in PCT/JP2011/073856 mailed on Jan. 17, 2012.

* cited by examiner

*Primary Examiner* — Andy Rao
*Assistant Examiner* — Tyler Edwards
(74) *Attorney, Agent, or Firm* — Birch, Stewart, Kolasch & Birch, LLP

(57) ABSTRACT

A same subject of imaging is captured continuously, one frame at a time, from plural viewpoints by imaging units, and a subject is detected from images of the captured frames, and, if plural subjects are detected, a range represented by a difference between a maximum value and a minimum value of distances between the imaging units and the subjects is computed. If a difference between a range of a specific frame and a range of a frame one before or after exceeds a predetermined threshold value, the range of the specific frame is adjusted such that the difference becomes smaller. Based on a predetermined relationship between ranges and parallax amounts corresponding to the ranges, a parallax amount corresponding to the computed range or the adjusted range is computed, and the parallax amounts and the images of the respective frames are recorded in correspondence with one another on a recording unit.

11 Claims, 10 Drawing Sheets

FIG.5A
FIG.5B
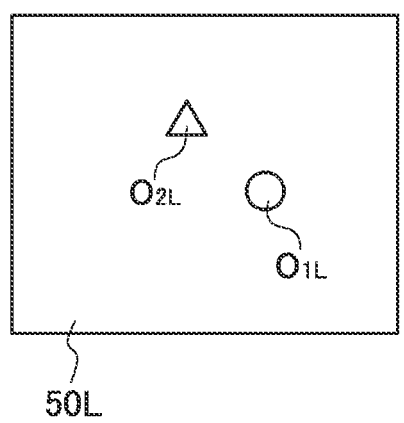
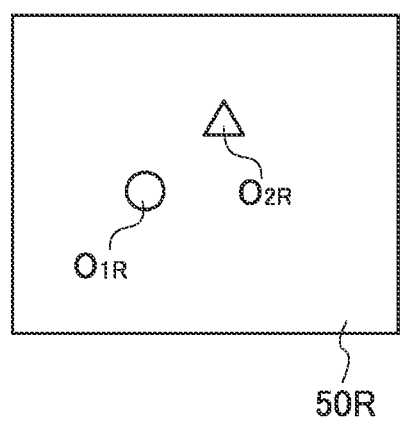

FIG.8

DISPLAY SCREEN SIZE: 3 INCHES

| SUBJECT DISTANCE RANGE (m) | PARALLAX AMOUNT (PIXELS) |
|---|---|
| 0.3 | 40 |
| 0.4 | 39 |
| ⋮ | ⋮ |
| 10 | 3 |

IMAGING DEVICE, METHOD AND COMPUTER READABLE MEDIUM

CROSS-REFERENCE TO RELATED APPLICATIONS

This application is a continuation application of International Application No. PCT/JP2011/073856, filed Oct. 17, 2011, which is incorporated herein by reference. Further, this application claims priority from Japanese Patent Application No. 2010-288749, filed Dec. 24, 2010, which is incorporated herein by reference.

TECHNICAL FIELD

The present invention relates to an imaging device, a method and a computer readable medium.

BACKGROUND ART

There is conventionally proposed a binocular parallax detecting method that determines, as the variation in pixel positions on left and right images, a binocular parallax variation amount that corresponds to a subject and a background or to plural subjects having different distances from a camera (see, for example, Japanese Patent Application Laid-Open No. 2-100589). In the method disclosed in this publication, when determining the binocular parallax, left and right images are two-dimensionally Fourier transformed, and several candidates for a parallax displacement amount are computed by shift matching the phase terms thereof. Thereafter, contour extraction and region determination of the subject are carried out for each of the left and right images, and correspondence is achieved with the displacement amount candidates determined by using two-dimensional Fourier transformation at a point at the inner side and plural points at the outer side of these boundary points, and a binocular parallax amount of a stereo image, that includes both a background and subjects having different parallax amounts, is determined.

Further, there is proposed a multi-viewpoint image display method that makes an overall image easy to view uniformly by changing the positional relationships between the convergence angle and the furthest distance, nearest distance, and shifting images so as to, for example, cancel-out the average value of the parallax between the images (see, for example, Japanese Patent Application Laid-Open No. 10-32840).

SUMMARY OF INVENTION

However, the method of Japanese Patent Application Laid-Open No. 2-100589 is applied to video images for stereoscopic viewing, and, when the binocular parallax amount is determined per one frame, in a case in which the change in the binocular parallax amount between frames is large, there become video images that are difficult to view stereoscopically.

Further, in the method of Japanese Patent Application Laid-Open No. 10-32840, a mechanism for changing the convergence angle is needed in order to obtain images that are easy to view stereoscopically.

The present invention provides an imaging device, a method and a computer readable medium which stores a program that reduce changes in the parallax amount between frames and can obtain stereoscopic images that are easy to view, without being provided with a complex mechanism.

An imaging device of the present invention is configured to include: a plurality of imaging units that continuously capture, one frame at a time, a same object of imaging from a plurality of different viewpoints respectively; a detecting unit that detects a subject from respective images of the frames captured by any one of the imaging units; a range computing unit that, in a case in which a plurality of subjects are detected by the detecting unit, computes values relating to distances between the respective detected subjects and the imaging units, and computes a range represented by a difference between a maximum value and a minimum value of the values; an adjusting unit that, in a case in which a difference between a range of a specific frame that has been computed by the range computing unit, and a range of a frame that has been captured one before or after the specific frame, exceeds a predetermined threshold value, adjusts the range of the specific frame such that the difference becomes smaller; a parallax amount computing unit that, on the basis of a predetermined relationship between ranges and parallax amounts corresponding to the ranges, computes a parallax amount that corresponds to the range computed by the range computing unit or the range adjusted by the adjusting unit; and a recording control unit that effects control so as to record the respective images of the frames captured by the respective imaging units, and the parallax amounts computed by the parallax amount computing unit, in correspondence with one another on a recording unit.

In accordance with the imaging device of the present invention, the same object of imaging is continuously captured, one frame at a time, from plural different viewpoints respectively by the imaging units. Due thereto, stereoscopic video images can be captured. Further, the detecting unit detects a subject from the respective images of the frames captured by any one of the imaging units. In a case in which plural subjects are detected by the detecting unit, the range computing unit computes values relating to distances between the respective detected subjects and the imaging units, and computes a range represented by the difference between the maximum value and the minimum value of these values. On the basis of this range, the parallax amount per frame is computed by the parallax amount computing unit. However, if fluctuations in the range between frames are large, the fluctuations in the parallax amount between frames also become large, and there become stereoscopic video images that are difficult to view.

Thus, in a case in which the difference between a range of a specific frame, that has been computed by the range computing unit, and a range of a frame, that has been captured one before or after the specific frame, exceeds a predetermined threshold value, the adjusting unit adjusts the range of the specific frame such that the difference becomes smaller. On the basis of a predetermined relationship between ranges and parallax amounts corresponding to the ranges, the parallax amount computing unit computes a parallax amount that corresponds to the range computed by the range computing unit or the range adjusted by the adjusting unit. Further, the recording control unit effects control so as to record the respective images of the frames captured by the respective imaging unit, and the parallax amounts computed by the parallax amount computing unit, in correspondence with one another on a recording unit.

In this way, if the difference between a range, that is based on values relating to the distances between the imaging units and the respective subjects detected from the specific frame, and a range of the frame that is one before or after the specific frame, is large, the range of the specific frame is adjusted such that this difference becomes smaller, and the appropriate parallax amount is computed from the range. Therefore, variations in parallax amount between frames are reduced and stereoscopic video images that are easy to view can be obtained, without providing a complex mechanism for adjusting the convergence angle.

The values relating to the distances can be made to be distances between the respective detected subjects and the imaging units, or respective parallaxes of the detected subjects. As the distance between a subject and an imaging unit becomes farther, the parallax of the subject becomes smaller, and as the distance becomes nearer, the parallax becomes larger. Therefore, it can be said that the parallax of each subject is a value relating to the distance between the subject and the imaging unit. At the range computing unit, in a case in which the distance between each subject and the imaging unit is computed, a subject distance range, that is represented by the difference between the maximum value and the minimum value of the distances, is computed, and, in a case in which the parallax of each subject is computed, a parallax range, that is represented by the difference between the maximum value and the minimum value of the parallaxes, is computed.

Further, in a case in which a subject, that has been used in computing the range of the frame that has been captured one before or after, is not detected from the specific frame, the adjusting unit can consider the difference between the range of the specific frame and the range of the frame that has been captured one before or after to have exceeded the predetermined threshold value, and can adjust the range of the specific frame. In a case in which the subject, that has been used in computing the range of the frame captured one before or after, is not detected from the specific frame, there is a strong possibility that the range fluctuates greatly. Therefore, by adjusting the range of the specific frame, variations in the parallax amount between frames can be reduced.

Further, the range computing unit can compute an amount of movement between frames of the subject detected by the detecting unit, and can compute the range by excluding a subject for which the amount of movement exceeds a predetermined amount of movement that is determined in advance. In this way, a subject, whose amount of movement is large and at which there is a strong possibility of leading to large fluctuations in the range between frames, is excluded in advance so as to not be used in computation of the range, and variations in the parallax amount between frames can thereby be reduced.

Further, the range computing unit can exclude a subject for which a direction of movement of the subject is an optical axis direction of the imaging unit and for which the amount of movement exceeds the predetermined amount of movement that is determined in advance. Because the range is the difference between the maximum value and the minimum value of the values relating to the distances between the subjects and the imaging units, a subject, that moves in the optical axis direction and at which the distance between the subject and the imaging unit fluctuates greatly, is made to be a target.

Further, the imaging device of the present invention can be configured so as to include a registering unit that registers in advance subjects detected by the detecting unit, and, in a case in which a subject that has been registered by the registering unit is detected by the detecting unit, the range computing unit can compute the range by using the registered subject. Due thereto, subjects for which careful watching is particularly desired are registered in advance, variations in the parallax amount between frames of subjects for which careful watching is desired are reduced, and stereoscopic images that are easy to view can be obtained.

Further, the imaging device of the present invention can be configured so as to include registering unit that registers in advance subjects detected by the detecting unit, and the range computing unit can compute the range by excluding a subject for which the amount of movement exceeds the predetermined amount of movement that is determined in advance and that is a subject that is not registered by the registering unit, or, if a subject is a subject registered by the registering unit, even in cases in which the amount of movement exceeds the predetermined amount of movement that is determined in advance, the range computing unit cannot exclude the subject from computation of the range.

Further, in a case in which one subject is detected by the detecting unit, the parallax amount computing unit can compute the parallax amount by using the subject as a crosspoint, and, in a case in which a subject is not detected by the detecting unit, the parallax amount computing unit can compute the parallax amount by using a predetermined point, that is determined in advance, as the crosspoint.

Further, an imaging method of the present invention is a method that: continuously captures, one frame at a time, a same object of imaging from a plurality of different viewpoints respectively by a plurality of imaging units; detects a subject from respective images of the frames captured by any one of the imaging units; in a case in which a plurality of subjects are detected, computes values relating to distances between the respective detected subjects and the imaging units, and computes a range represented by a difference between a maximum value and a minimum value of the values; in a case in which a difference between a computed range of a specific frame and a range of a frame, that has been captured one before or after the specific frame, exceeds a predetermined threshold value, adjusts the range of the specific frame such that the difference becomes smaller; on the basis of a predetermined relationship between ranges and parallax amounts corresponding to the ranges, computes a parallax amount that corresponds to the computed range or the adjusted range; and records the respective images of the frames captured by the respective imaging units, and the computed parallax amounts, in correspondence with one another on a recording unit.

A non-transitory computer readable medium which stores an imaging program for causing a computer to function as: an imaging control unit that respectively controls a plurality of imaging units to continuously capture, one frame at a time, a same object of imaging from a plurality of different viewpoints respectively; a detecting unit that detects a subject from respective images of the frames captured by any one of the imaging units; a computing unit that, in a case in which a plurality of subjects are detected by the detecting unit, computing values relating to distances between the respective detected subjects and the imaging units, and computes a range represented by a difference between a maximum value and a minimum value of the values; an adjusting unit that, in a case in which a difference between a range of a specific frame that has been computed by the range computing unit, and a range of a frame that has been captured one before or after the specific frame, exceeds a predetermined threshold value, adjusts the range of the specific frame such that the difference becomes smaller; a parallax amount computing unit that, on the basis of a predetermined relationship between ranges and parallax amounts corresponding to the ranges, computing a parallax amount that corresponds to the range computed by the range computing unit or the range adjusted by the adjusting unit; and a recording control unit that effects control so as to record the respective images of the frames captured by the respective imaging units, and the parallax amounts computed by the parallax amount computing unit, in correspondence with one another on a recording unit.

As described above, in accordance with the imaging device, the method and the computer readable medium of the present invention, in a case in which the difference between a range, that is based on values relating to distances between imaging units and respective subjects detected from a specific frame, and a range of a frame that is one before or after the specific frame, is large, the range of the specific frame is adjusted such that this difference becomes smaller, and the appropriate parallax amount is computed from the range. Therefore, variations in parallax amount between frames are reduced and stereoscopic video images that are easy to view can be obtained, without providing a complex mechanism for adjusting the convergence angle.

BRIEF DESCRIPTION OF DRAWINGS

FIG. 5A is an image drawing showing the positional relationship between an imaging section and a subject for explaining parallax amount.

FIG. 5B is an image drawing showing a left image and a right image for explaining parallax amount.

FIG. 8 is an example of a table showing the relationship between parallax amount and subject distance range.

DESCRIPTION OF EMBODIMENTS

Embodiments of the present invention are described in detail hereinafter with reference to the drawings. Note that the present embodiments describe cases in which the imaging device of the present invention is applied to a compound-eye digital camera equipped with a video image capturing mode.

Figure 1:
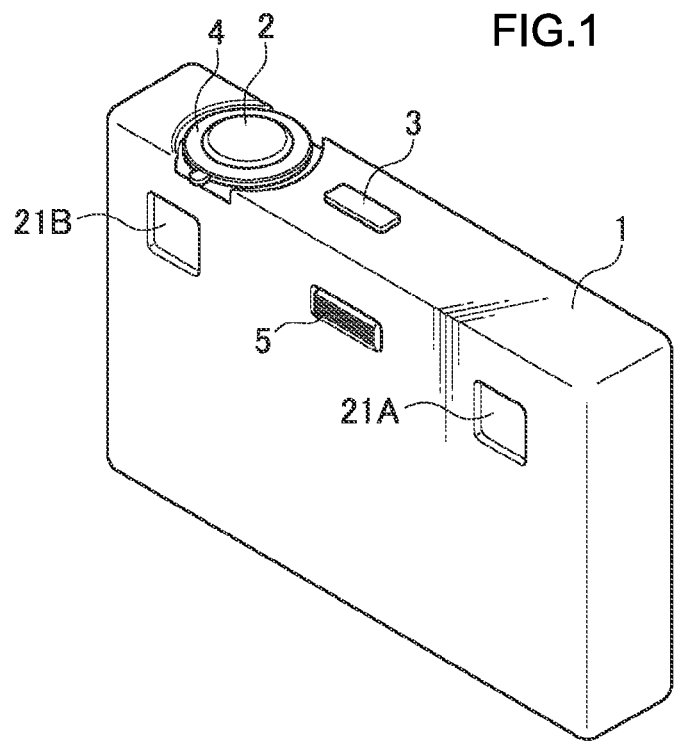
FIG. 1 is a front side perspective view of a compound-eye digital camera of a present embodiments.
Figure 2:
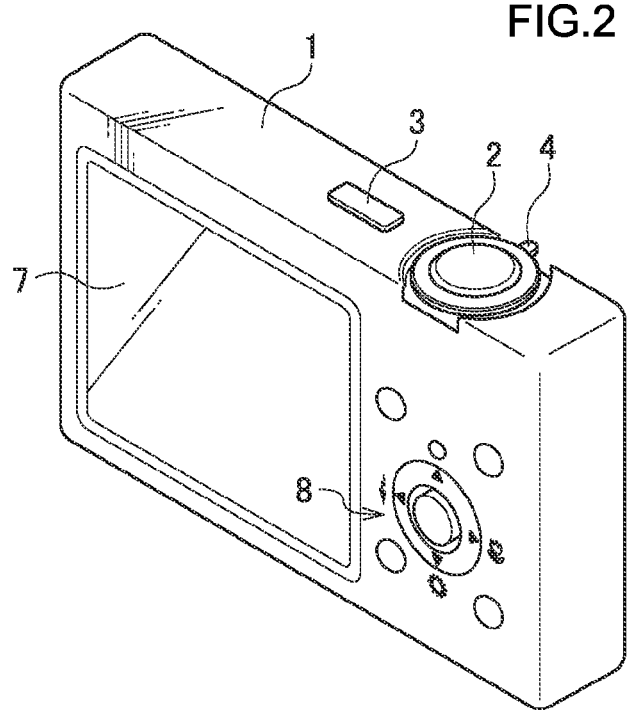
FIG. 2 is a rear side perspective view of the compound-eye digital camera of the present embodiments.

FIG. 1 is a front side perspective view of a compound-eye digital camera 1 of a first embodiment, and FIG. 2 is a rear side perspective view. As shown in FIG. 1, a release button 2, a power button 3, and a zoom lever 4 are provided at the upper portion of the compound-eye digital camera 1. Further, a flash 5 and lenses of two imaging sections 21A, 21B are disposed at the front surface of the compound-eye digital camera 1. Further, a liquid crystal monitor 7, that carries out various types of display, and various types of operation buttons 8 are disposed at the rear surface of the compound-eye digital camera 1.

Figure 3:
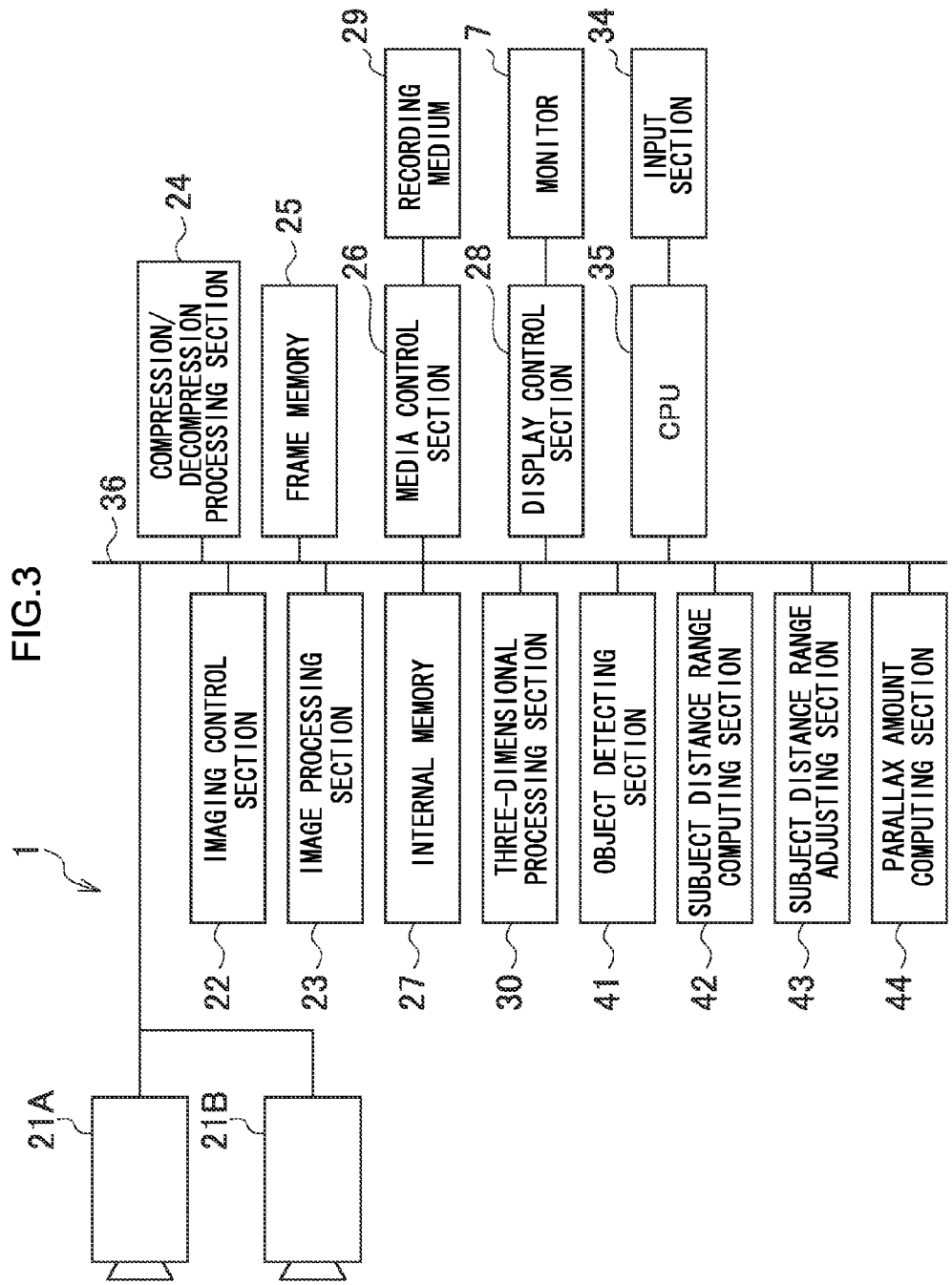
FIG. 3 is a schematic block drawing showing the internal configure of the compound-eye digital camera of the present embodiments.

FIG. 3 is a schematic block drawing showing the internal configure of the compound-eye digital camera 1. As shown in FIG. 3, the compound-eye digital camera 1 is equipped with the two imaging sections 21A, 21B, an imaging control section 22, an image processing section 23, a compression/decompression processing section 24, a frame memory 25, a media control section 26, an internal memory 27, a display control section 28, a three-dimensional processing section 30, an object detecting section 41, a subject distance range computing section 42, a subject distance range adjusting section 43, and a parallax amount computing section 44. Note that the imaging sections 21A, 21B have a convergence angle at which the subject is viewed, and are disposed such that there is a predetermined baseline length. Note that the information of the convergence angle and the baseline length is stored in the internal memory 27.

The imaging control section 22 is formed from an unillustrated AF processing section and AE processing section. In a case in which a static image capturing mode is selected, on the basis of pre-images acquired by the imaging sections 21A, 21B due to the release button 2 being push-operated halfway, the AF processing section determines the focus region, and determines the focal point positions of the lenses, and outputs them to the imaging sections 21A, 21B. On the basis of the pre-images, the AE processing section determines the diaphragm value and the shutter speed, and outputs them to the imaging sections 21A, 21B. Further, due to full push-operation of the release button 2, an instruction for actual imaging, that causes the imaging section 21A to acquire the actual image of the left image and causes the imaging section 21B to acquire the actual image of the right image, is given.

Further, in a case in which a video image capturing mode is selected, due to full push-operation of the release button 2, the imaging control section 22 instructs the imaging section 21A and the imaging section 21B to continuously carry out processing in the above-described static image capturing mode. Note that in both cases of the static image capturing mode and the video image capturing mode, before the release button 2 is operated, the imaging control section 22 instructs the imaging sections 21A, 21B to successively acquire, at a predetermined time interval (e.g., an interval of 1/30 second), images that have fewer pixels than the actual images and are for confirming the imaging range.

The image processing section 23 carries out image processings such as the processing of adjusting the white balance, gradation correction, sharpness correction, and color correction and the like on the digital image data of the left image and the right image that the imaging sections 21A, 21B have acquired.

The compression/decompression processing section 24 carries out compression processing in a compression format such as, for example, JPEG or the like, on the image data representing the left image and the right image that have been subjected to processing by the image processing section 23, and generates an image file for stereoscopic viewing. This image file for stereoscopic viewing includes the image data of the left image and the right image, and, on the basis of Exif format or the like, accessory information such as the baseline length, the convergence angle, the imaging date and time and the like, and viewpoint information representing the viewpoint position, are stored therein.

The frame memory 25 is a memory for work that is used when carrying out various types of processings, including the aforementioned processings that the image processing section 23 carries out, on the image data representing the left image and the right image that the imaging sections 21A, 21B acquired.

The media control section 26 carries out control of accessing a recording medium 29 and writing and reading image files and the like.

The internal memory 27 stores various types of constants that are set at the compound-eye digital camera 1, and programs that the CPU 35 executes, and the like.

The display control section 28 displays, on the liquid crystal monitor 7, a stereoscopic image that is generated from the left image and the right image that have been stored in the frame memory 25 at the time of imaging, and displays, on the liquid crystal monitor 7, the left image and the right image, or an image for stereoscopic viewing, that are recorded on the recording medium 29.

In order to stereoscopically display the left image and the right image on the liquid crystal monitor 7, the three-dimensional processing section 30 carries out three-dimensional processing on the left image and the right image, and generates an image for stereoscopic viewing.

The object detecting section 41 detects an appropriate object from the acquired left image or right image. An object is an image depicting a subject that exists in the region that is the object of imaging. An "appropriate" object can be an object at which there is an edge in the left image or the right image, or the like. Further, a corresponding object may be detected from each of the left image and the right image, and it may be detected whether the value of the parallax of that object is within a predetermined range.

Further, when the object detecting section 41 detects an object from an image of the second frame or a frame thereafter, by using positional information or the like of the object, that has been detected from images of past frames, and tracking the corresponding object, the object detecting section 41 detects the object from the current frame.

Figure 4A:
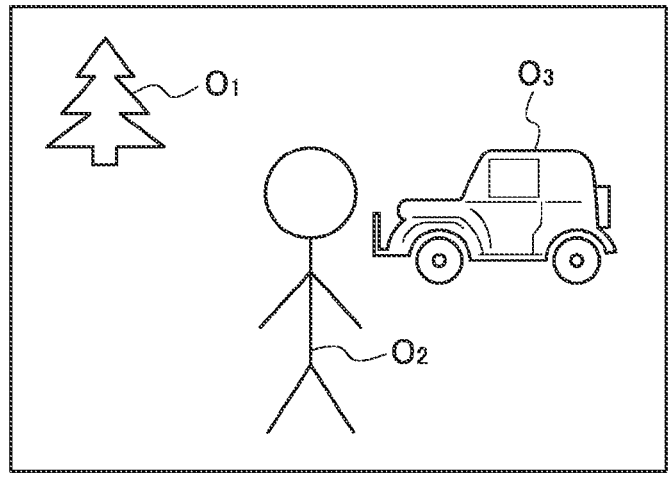
FIG. 4A is an image drawing for explaining computation of a subject distance range.
Figure 4B:
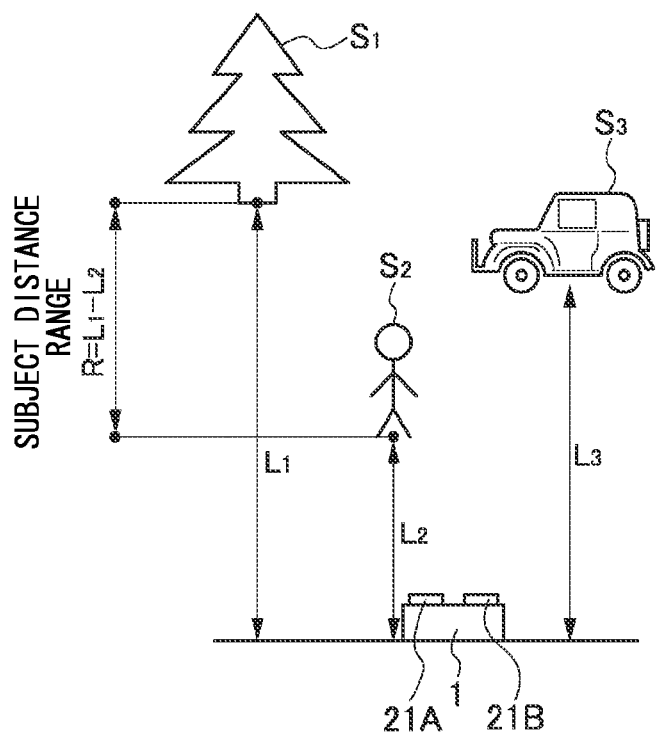
FIG. 4B is an image drawing for explaining computation of the subject distance range.

The subject distance range computing section 42 computes, by a method such as triangulation or the like and for each object detected from the left image or the right image, the distance between the subject that represents the object and the present device (the imaging section 21A, 21B), and computes the difference between the maximum value and the minimum value of the distances as a subject distance range. For example, it is assumed that, as shown in FIG. 4A, objects $O_1, O_2, O_3$ are detected from the left image or the right image, and the compound-eye digital camera 1 and subjects $S_1, S_2, S_3$, that correspond to the objects $O_1, O_2, O_3$, respectively have the positional relationships shown in FIG. 4B. Given that the distance between the compound-eye digital camera 1 and the subject $S_1$ is $L_1$, and the distance between the compound-eye digital camera 1 and the subject $S_2$ is $L_2$, and the distance between the compound-eye digital camera 1 and the subject $S_3$ is $L_3$, the maximum value of the distances between the compound-eye digital camera 1 and the subjects is $L_1$, and the minimum value is $L_2$, and therefore, a subject distance range R is computed as $R=L_1-L_2$.

The subject distance range adjusting section 43 judges whether or not the difference between the subject distance range that has been computed for the image of the previous frame, and the subject distance range that has been computed for the image of the current frame, exceeds a predetermined threshold value. If the difference exceeds the threshold value, the subject distance range adjusting section 43 adjusts the subject distance range of the current frame such that the difference between the subject distance range of the previous frame and the subject distance range of the current frame becomes smaller. As described later, because the parallax amount of each frame is computed on the basis of the subject distance range, large fluctuations in the subject distance range between frames becomes large fluctuations in the parallax amount between frames. If the parallax amount fluctuates greatly between frames, there become video images that are difficult to view, and therefore, the subject distance range is adjusted such that the fluctuations in the parallax amount do not become large. For example, given that the subject distance range of the current frame is $R_m$, and the that subject distance range of the frame that is one before is $R_{m-1}$, a post-adjustment subject distance range $R_m'$ of the current frame can be determined as $R_m'=\alpha \times R_m + (1-\alpha) \times R_{m-1}$ ($0<\alpha<1$). Note that the way of determining the post-adjustment subject distance range $R_m'$ of the current frame is not limited to this, and it suffices for there to be an adjustment method that is such that the difference between $R_m$ and $R_{m-1}$ becomes small, such as addition/subtraction of a predetermined value with respect to Rm.

On the basis of a predetermined relationship between subject distance ranges and appropriate parallax values corresponding to the subject distance ranges, the parallax amount computing section 44 computes the parallax amount of the current frame from the computed subject distance range or the adjusted subject distance range.

Figure 6:
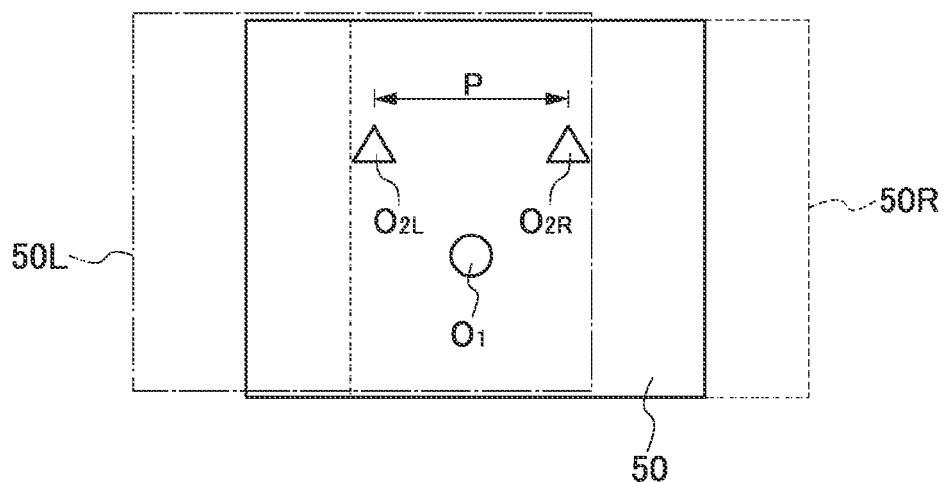
FIG. 6 is an image drawing showing a stereoscopic image for explaining parallax amount.

Parallax amount is described here. For example, it is assumed that a subject $S_1$ and a subject $S_2$, whose positional relationships with the compound-eye digital camera 1 (the imaging sections 21A and 21B) are those shown in FIG. 5A, are captured, and a left image 50L and a right image 50R such as shown in FIG. 5B are obtained. An object $O_{1L}$ that corresponds to the subject $S_1$, and an object $O_{2L}$ that corresponds to the subject $S_2$, are detected from the left image 50L. An object $O_{1R}$ that corresponds to the subject $S_1$, and an object $O_2R$ that corresponds to the subject $S_2$, are detected from the right image 50R. As shown in FIG. 6, by superposing the left image 50L and the right image 50R, there becomes a stereoscopic image 50. In FIG. 6, the left image 50L and the right image 50R are superposed such that the object $O_{1L}$ included in the left image 50L and the object $O_{1R}$ included in the right image 50R match, i.e., such that object $O_1$ becomes the crosspoint. The object $O_{2L}$ and the object $O_{2R}$ are offset by distance P. This P is the parallax amount, and, by changing the parallax amount P, the stereoscopic feel of the stereoscopic image can be enhanced or mitigated.

Figure 7:
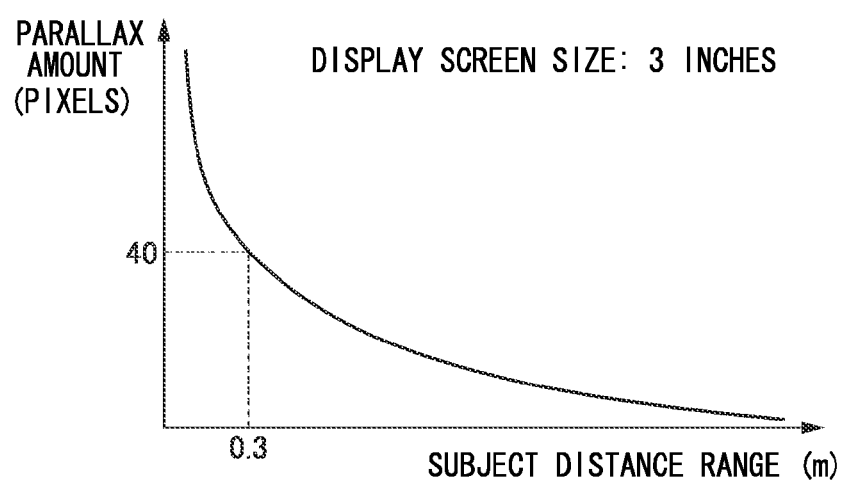
FIG. 7 is an example of a graph showing the relationship between parallax amount and subject distance range.

The relationship between parallax amount and subject distance range is described next. If the subject distance range is small, the relative parallax between the furthest subject, that exists furthest from the compound-eye digital camera 1, and the nearest subject, that exists nearest, is small. On the other hand, if the subject distance range is large, the relative parallax between the furthest subject and the nearest subject is large. Thus, in order to obtain a stereoscopic image having an appropriate stereoscopic feel, the parallax amount is increased if the subject distance range is small, and the parallax amount is decreased if the subject distance range is large. On the basis of this relationship, a parallax amount, that is suited for displaying a stereoscopic image on a display screen of a predetermined size, is determined in accordance with the subject distance range. For example, as shown in FIG. 7, a graph can be made with the subject distance range on the horizontal axis and the parallax amount on the vertical axis, and the relationship between parallax amount and subject distance range can be determined for each size of display screen. Or, as shown in FIG. 8, a table, in which the parallax amount in units of pixels and the subject distance range are set in correspondence, may be made, and the relationship between parallax amount and subject distance range may be determined.

On the basis of a predetermined relationship between parallax amount and subject distance range such as that shown in FIG. 7 or FIG. 8, the parallax amount computing section 44 computes a parallax amount that corresponds to the subject distance range computed at the subject distance range computing section 42 or the subject distance range adjusted at the subject distance range adjusting section 43. For example, in FIG. 7 and FIG. 8, in a case in which the display screen size is 3 inches and the computed or adjusted subject distance range is 0.3 m, the parallax amount is 40 pixels. In the present embodiment, the parallax amount that is computed at the parallax amount computing section 44 is the parallax amount for the object that represents the nearest subject. Namely, when the left image and right image are superposed as shown in FIG. 6, the images are superposed such that the distance between the object, that represents the nearest subject of the left image, and the object, that represents the nearest subject of the right image, is offset by the computed parallax amount.

Further, in a case in which only one object is detected at the object detecting section 41, and the parallax amount computing section 44 computes the parallax amount by using the detected object as the crosspoint. Further, in a case in which an object is not detected at the object detecting section 41, the parallax amount is computed by using a predetermined point, that has been determined in advance, as the crosspoint.

Figure 9:
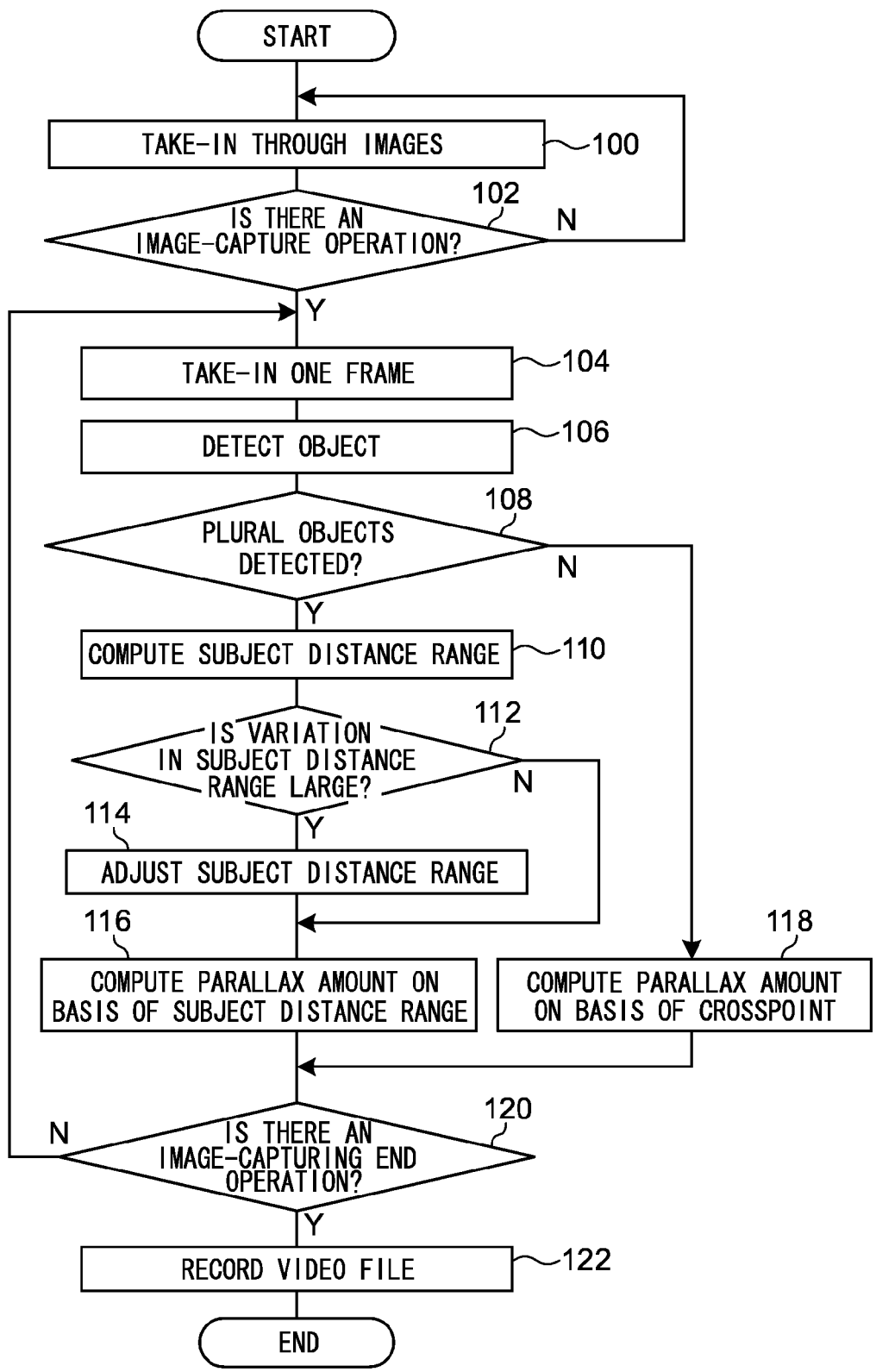
FIG. 9 is a flowchart showing the contents of a video image capturing processing routine in a first embodiment.

A video image capturing processing routine, that is executed at the compound-eye digital camera 1 of the first embodiment, is described next with reference to FIG. 9. The present routine starts due to the operation button 8 being operated by a user and the video image capturing mode being selected.

In step 100, the taking-in of through images that are captured by the imaging sections 21A and 21B is started.

Next, in step 102, it is judged whether or not there has been an image-capture operation that instructs the start of recording of video images, such as the release button 2 being depressed or the like. If there has been an image-capture operation, the routine moves on to step 104. If there is no image-capture operation, the judgment of the present step is repeated until there is an image-capture operation.

In step 104, one frame of the left image and the right image, that have been acquired in the state of actual imaging by the imaging sections 21A and 21B, are taken-in. Next, in step 106, an appropriate object is detected from the left image or the right image that have been taken-in in above step 104.

Next, in step 108, it is judged whether or not plural objects have been detected in above step 106. If plural objects have been detected, the routine moves on to step 110. If only one object has been detected or if an object has not been detected, the routine moves on to step 118.

In step 110, for each object detected from the left image or the right image, the distance between the subject that represents the object and the compound-eye digital camera 1 is computed by a method such as triangulation or the like, and the difference between the maximum value and minimum value of the distances is computed as the subject distance range.

Next, in step 112, by judging whether or not the difference between the subject distance range of the previous frame and the subject distance range of the current frame exceeds a predetermined threshold value, it is judged whether or not the variation in the subject distance range between frames is large. If the variation in the subject distance range between frames is large, the routine moves on to step 114 where the subject distance range of the current frame is adjusted so that the difference between the subject distance range of the previous frame and the subject distance range of the current frame becomes smaller, and the routine moves on to step 116.

If it is judged in above step 112 that the variation in the subject distance range between frames is not large, step 114 is skipped and the routine moves on to step 116. Further, also in a case in which the current frame is the first frame and a previous frame does not exist, the judgment in the present step is negative, and the routine moves on to step 116.

In step 116, on the basis of a predetermined relationship between subject distance ranges and appropriate parallax amounts corresponding to the subject distance ranges such as shown in FIG. 7 or FIG. 8 for example, the parallax amount of the current frame, that corresponds to the subject distance range computed in above step 110 or the subject distance range adjusted in above step 114, is computed, and the routine moves on to step 120.

On the other hand, if the judgment in above step 108 is negative and the routine moves on to step 118, the parallax amount is computed on the basis of the crosspoint. In a case in which only one object has been detected, that object is used as the crosspoint, and, in a case in which no object has been detected, a predetermined point is used as the crosspoint, and the parallax amount is computed and the routine moves on to step 120.

In step 120, it is judged whether or not there has been an image-capturing end operation that instructs the stopping of recording of video images, such as the release button 2 has been depressed again or the like. If there is no image-capturing end operation, the routine returns to step 104, and the next frame is taken-in and processing is repeated. If there has been an image-capturing end operation, the routine moves on to step 122 where the left image, the right image and data of the parallax amount of each frame of the number of frames that have been captured is made into one file, and is recorded on the recording medium 29 as a video file in which header information is added to that file, and processing ends.

As described above, in accordance with the compound-eye digital camera of the first embodiment, a subject distance range is computed for each frame. If the difference between the computed subject distance range of the current frame and subject distance range of the previous frame is large, the subject distance range of the current frame is adjusted such that the difference between the subject distance range of the previous frame and the subject distance range of the current frame becomes smaller, and an appropriate parallax amount is computed from the subject distance range. Due thereto, variations in parallax amount between frames are reduced and stereoscopic video images that are easy to view can be obtained, without providing a complex mechanism for adjusting the convergence angle.

A second embodiment is described next. In the second embodiment, description is given of a case in which, if the object, that has been used in computing the subject distance range of the previous frame, is not detected from the current frame, the difference between the subject distance range of the previous frame and the subject distance range of the current frame is considered to be large, and the subject distance range of the current frame is adjusted. Note that, because the configure of the compound-eye digital camera of the second embodiment is similar to the configure of the compound-eye digital camera 1 of the first embodiment, the same reference numerals are used and description is omitted.

Figure 10:
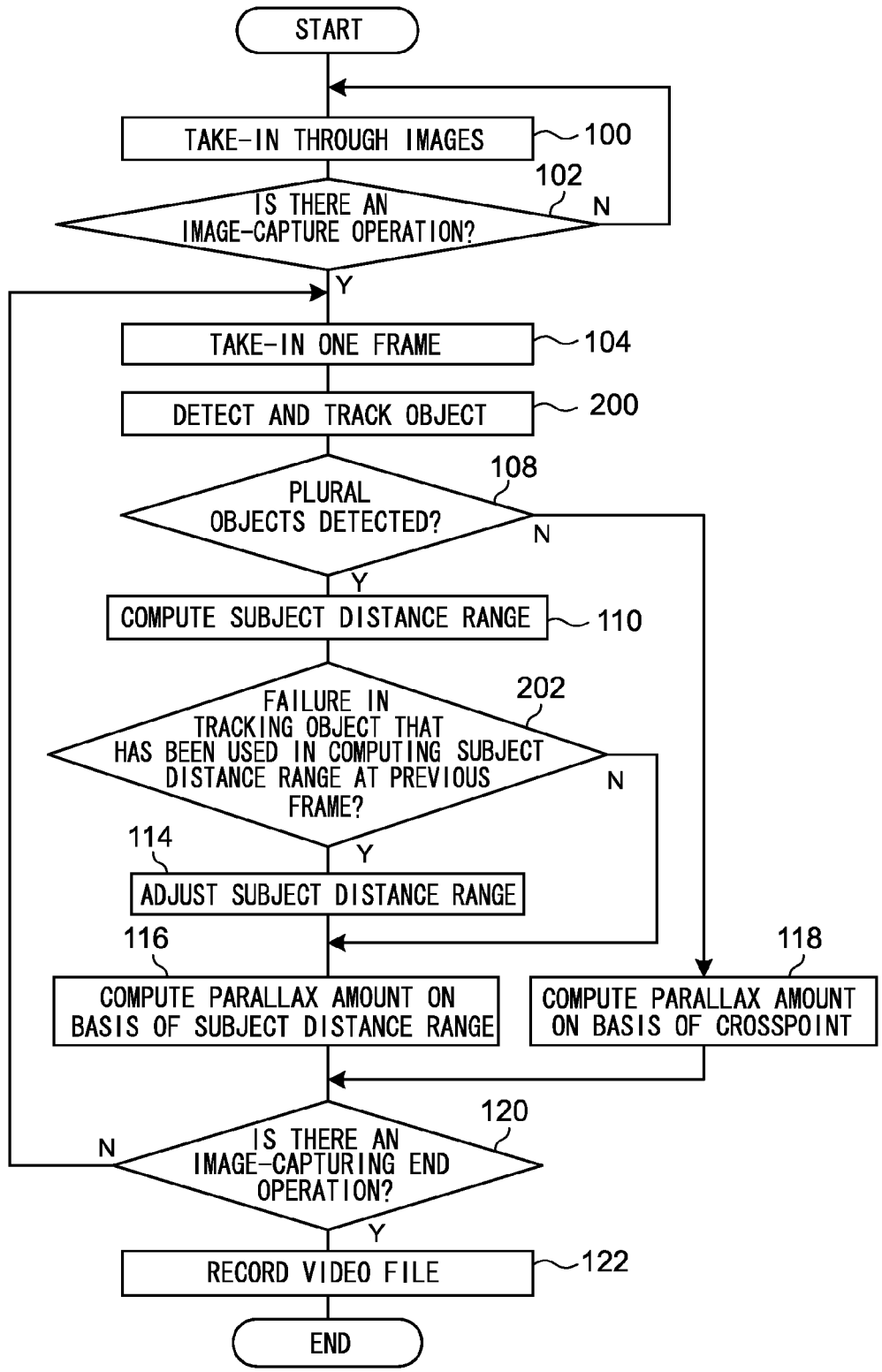
FIG. 10 is a flowchart showing the contents of a video image capturing processing routine in a second embodiment.

Here, a video image capturing processing routine that is executed by the compound-eye digital camera 1 of the second embodiment is described with reference to FIG. 10. The present routine starts due to the operation button 8 being operated by the user and the video image capturing mode being selected. Note that processings that are the same as those of the video image capturing processing of the first embodiment are denoted by the same reference numerals, and detailed description thereof is omitted.

Through step 100 to step 104, one frame of the left image and the right image are taken-in. Next, in step 200, an appropriate object is detected from the left image or the right image that have been taken-in in above step 104. Further, an object, that has been detected from the left image or the right image of the previous frame, is tracked in the left image or the right image of the current frame by using positional information of the object or the like.

Next, in step 108, if it is judged that plural objects have been detected in above step 106, the routine moves on to step 110 where the difference between the maximum value and the minimum value of the distances between the subjects represented by the objects and the compound-eye digital camera 1 is computed as the subject distance range.

Next, in step 202, on the basis of the results of tracking the object in above step 200, it is judged whether or not tracking of the object, that has been used in computing the subject distance range at the previous frame, has failed. In a case in which the object that has been detected from the previous frame is not detected from the current frame due to the object moving out-of-frame or the object being occluded by another object or the like, it is judged that tracking of the object has failed. In a case in which tracking of the object used in computing the subject distance range at the previous frame fails, there is the strong possibility that the subject distance range that has been computed in above step 110 is fluctuating greatly with respect to the subject distance range computed at the previous frame. Thus, in a case in which tracking of the object that has been used in computing the subject distance range of the previous frame fails, the routine moves on to step 114 where the subject distance range of the current frame is adjusted such that the difference between the subject distance range of the previous frame and the subject distance range of the current frame becomes smaller. On the other hand, if the tracking of the object used in computing the subject distance range of the previous frame has not failed, step 114 is skipped, and the routine moves on to step 116 without adjusting the subject distance range, and the parallax amount is computed from the subject distance range. From there on, in the same way as in the first embodiment, the processings of step 116 to step 122 are executed, and processing ends.

As described above, in accordance with the compound-eye digital camera of the second embodiment, in a case in which tracking of the object used in computing the subject distance range of the previous frame fails, the difference between the subject distance range of the current frame and the subject distance range of the previous frame is considered to be large, and the subject distance range of the current frame can be adjusted such that the difference between the subject distance range of the previous frame and the subject distance range of the current frame becomes smaller.

A third embodiment is described next. In the third embodiment, description is given of a case in which objects whose amounts of movement are large are excluded so as to not be used in computing the subject distance range. Note that, because the configuration of the compound-eye digital camera of the third embodiment is similar to the configuration of the compound-eye digital camera 1 of the first embodiment, the same reference numerals are used and description is omitted.

Figure 11:
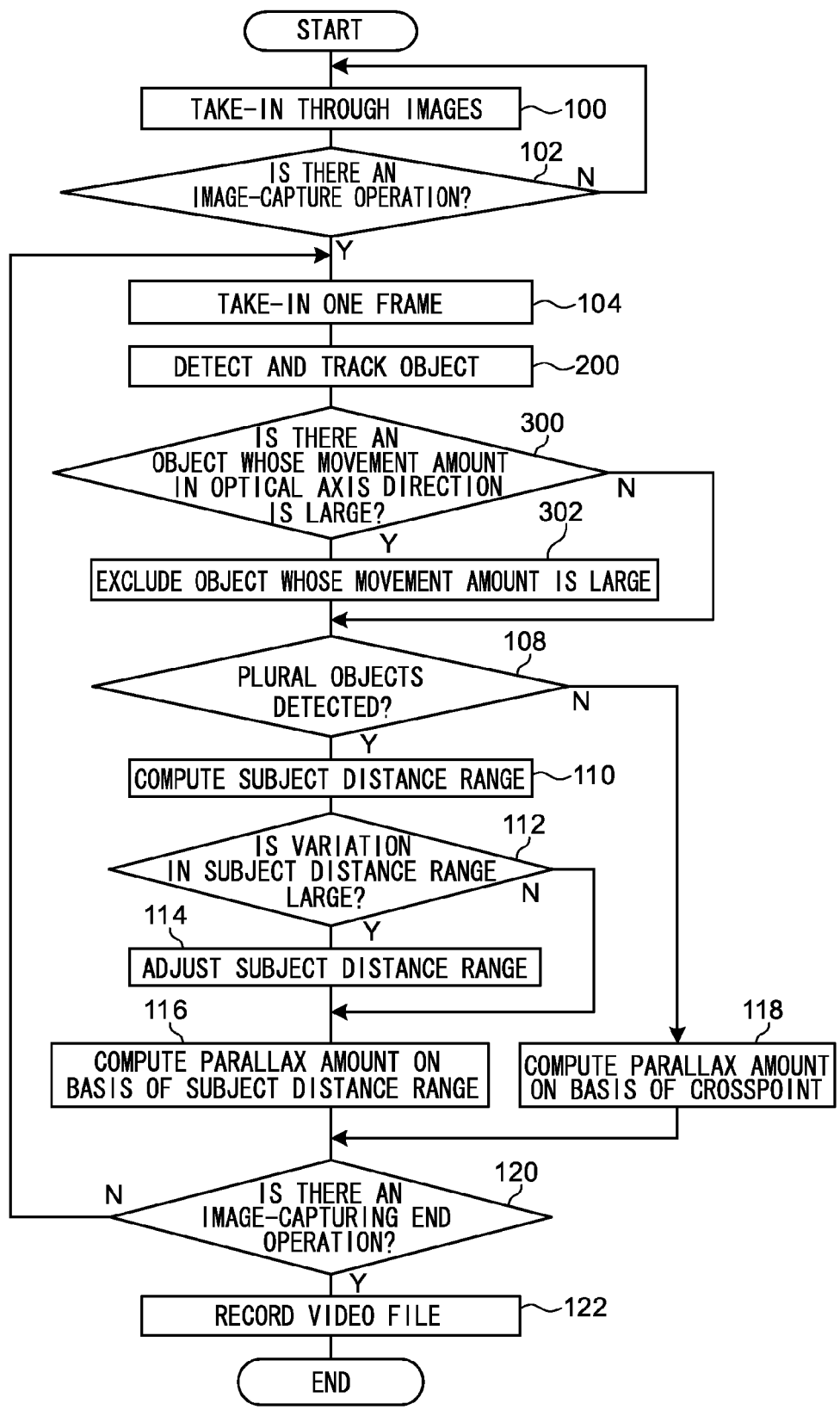
FIG. 11 is a flowchart showing the contents of a video image capturing processing routine in a third embodiment.

Here, a video image capturing processing routine that is executed by the compound-eye digital camera 1 of the third embodiment is described with reference to FIG. 11. The present routine starts due to the operation button 8 being operated by the user and the video image capturing mode being selected. Note that processings that are the same as those of the video image capturing processings of the first and second embodiments are denoted by the same reference numerals, and detailed description thereof is omitted.

Through step 100 to step 104, one frame of the left image and the right image are taken-in. Next, in step 200, an appropriate object is detected from the left image or the right image that have been taken-in in above step 104. Further, an object, that has been detected from the left image or the right image of the previous frame, is tracked in the left image or the right image of the current frame by using positional information of the object or the like.

Next, in step 300, on the basis of the results of tracking the object of above step 200, it is judged whether or not the direction of movement of the tracked object is the optical axis direction of the imaging section. If the image that is used in the detection and tracking of the object is the left image, the optical axis direction of the imaging section is the optical axis direction of the imaging section 21A, and if it the right image, it is the imaging section 21B. Further, for an object whose direction of movement is the optical axis direction, the amount of movement between frames is computed, and, by comparing this amount of movement with a predetermined amount of movement that is determined in advance, it is judged whether or not there exists an object whose amount of movement is large. If such an object exists, the routine moves on to step 302 where the object whose amount of movement is large is excluded from the objects that have been detected and tracked in above step 200, and the routine moves on to step 108. For a subject that corresponds to an object whose amount of movement is large, because the speed of movement thereof is rapid, the distance between the subject and the compound-eye digital camera 1 fluctuates greatly between frames. When an object that depicts such a subject is used in computing the subject distance range, the subject distance range fluctuates greatly, and therefore, such an object is excluded so as to not be used in computing the subject distance range. On the other hand, if an object whose amount of movement of large does not exist, step 302 is skipped and the routine moves on to step 108. In step 108, it is judged whether or not plural objects have been detected other than the object excluded in above step 302, and, from there on, in the same way as in the first embodiment, the processings of step 110 to step 122 are executed, and processing ends.

As described above, in accordance with the compound-eye digital camera of the third embodiment, an object, whose amount of movement is large and for which there is a strong possibility of leading to a large fluctuation in the subject distance range between frames, is excluded in advance so as to not be used in computing the subject distance range. Due thereto, fluctuations in the subject distance range between frames can be reduced.

A fourth embodiment is described next. In the fourth embodiment, description is given of a case in which objects, that a user particularly wishes to watch carefully, are selected and registered in advance. Note that, because the configuration of the compound-eye digital camera of the fourth embodiment is similar to the configuration of the compound-eye digital camera 1 of the first embodiment, the same reference numerals are used and description is omitted.

Figure 12:
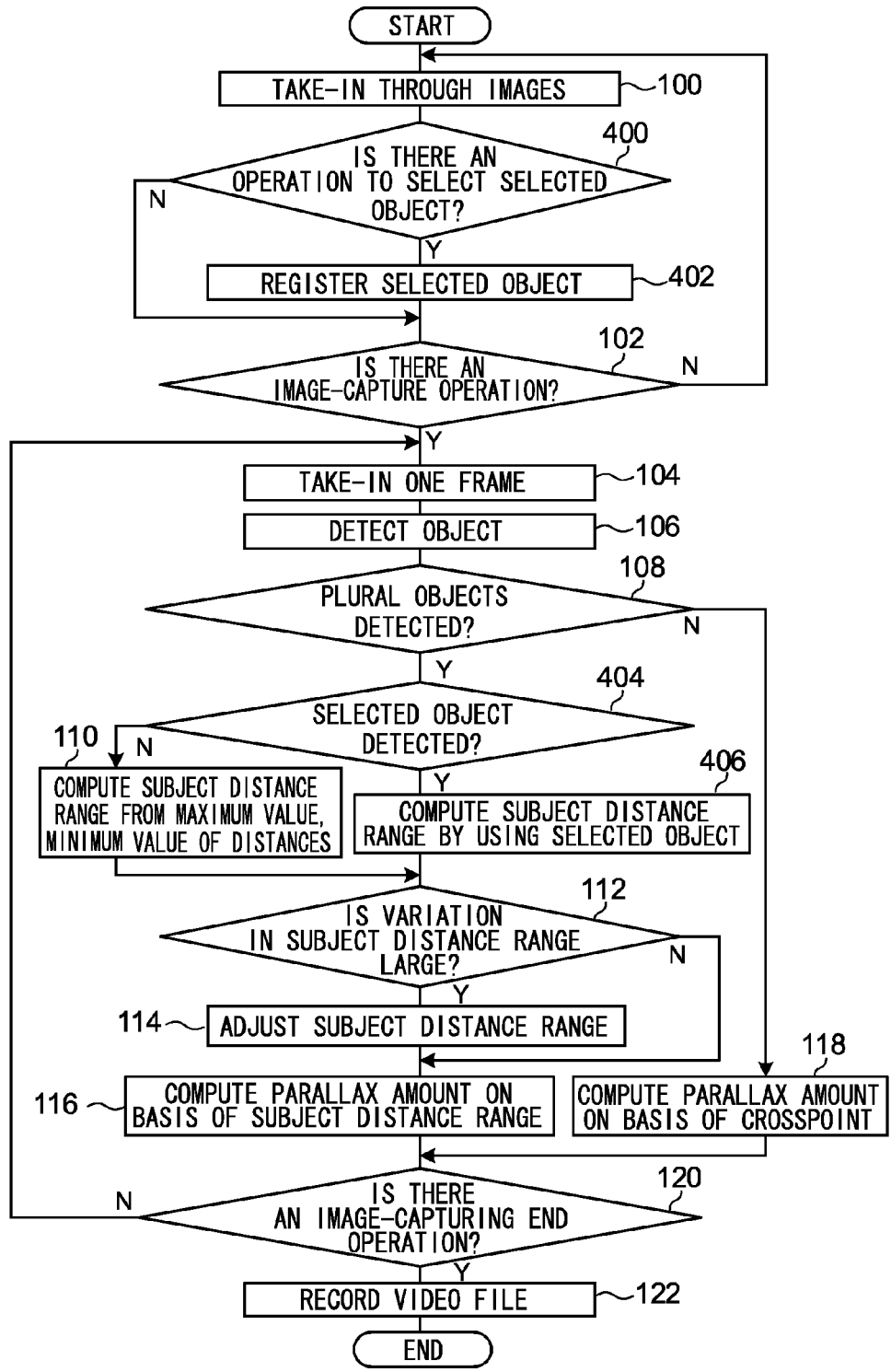
FIG. 12 is a flowchart showing the contents of a video image capturing processing routine in a fourth embodiment.

Here, a video image capturing processing routine that is executed by the compound-eye digital camera 1 of the fourth embodiment is described with reference to FIG. 12. The present routine starts due to the operation button 8 being operated by the user and the video image capturing mode being selected. Note that processings that are the same as those of the video image capturing processing of the first embodiment are denoted by the same reference numerals, and detailed description thereof is omitted.

In step 100, through images are taken-in. Next, in step 400, it is judged by the user whether or not to carry out an operation of selecting an object that is to be watched carefully in particular (hereinafter called "selected object"). A selected object can be selected by operating the operation button 8 and moving the cursor on the image displayed on the liquid crystal monitor 7, and depressing the select button on that object, or the like.

Next, in step 402, for a selected object that has been selected in above step 400, information such as the contour or characteristic amount or the like thereof is extracted, and is registered in a predetermined storage area. Plural selected objects may be registered.

Next, through step 102 to step 108, if it judged that plural objects have been detected, the routine moves on to step 404. The detected objects and the information of the selected objects that has been registered in above step 402 are compared, and it is judged whether or not a selected object is included in the detected objects. If a selected object is included, the routine moves on to step 406, and, if a selected object is not included, the routine moves on to step 110.

In step 406, the subject distance range is computed by using the selected object. In a case in which plural selected objects are registered and plural selected objects have been detected, the difference between the maximum value and the minimum value of the distances between the compound-eye digital camera 1 and the subjects represented by the respective selected objects that have been detected can be computed as the subject distance range. Further, if only one selected object is included in the detected plural objects, the subject distance range is computed by using the selected object and one object among the objects other than the selected object. An object at which the distance between the subject represented by the object and the compound-eye digital camera 1 is a maximum or a minimum, or an object that corresponds to a subject at which the distance between that subject and the subject represented by the selected object is a maximum or a minimum, or the like can be used as the object other than the selected object. From there on, in the same way as in the first embodiment, the processings of step 112 to step 122 are executed, and processing ends. Note that, in a case in which the detected object is only one selected object, the judgment in step 108 is negative and the routine moves on to step 118 where the parallax amount, that makes that selected object be the crosspoint, is computed.

As described above, in accordance with the compound-eye digital camera of the fourth embodiment, the subject distance range is computed by using an object for which careful watching is desired in particular, and further, the subject distance range is adjusted such that the fluctuations in the subject distance range between frames do not become large. Due thereto, when viewing while carefully watching a specific object, stereoscopic images that are easy to view can be obtained.

Note that, in the above-described first through fourth embodiments, description is given of cases in which the distance between each subject and the imaging units is computed as the value that relates to the distance between the subject and the imaging units, and the subject distance range, that is represented by the difference between the maximum value and the minimum value of these distances, is computed. However, the parallax amount of each subject may be computed as the value relating to the distance between the subject and the imaging units, and a parallax range, that is represented by the difference between the maximum value and the minimum value of the parallaxes, may be computed. In this case, it is good to provide a parallax range computing section and a parallax range adjusting section instead of the subject distance range computing section 42 and the subject distance range adjusting section 43 shown in FIG. 3.

At the parallax range computing section, a parallax map is generated, the parallax of each object detected at the object detecting section 41 is determined, and the parallax range is computed from the difference between the maximum value and the minimum value of the parallaxes. Note that, in a case in which a selected object is registered, the parallax range is computed by using the parallax of the selected object. In generating a parallax map, first, stereo matching is carried out with respect to the left image and the right image, and, by using the left image as the reference for example, a corresponding pixel (x2, y2) on the right image, that corresponds to a pixel (x1, y1) on the left image, is extracted. Parallax d between the pixel (x1, y1) on the left image and the corresponding pixel (x2, y2) on the right image can be calculated as d=x2−x1, and this parallax d is stored for the pixel position (x1, y1) of the left image that is the reference, and the parallax map is generated. Then, detected objects and the parallax map are made to correspond to one another, and the parallax that is stored at the pixel position on the parallax map that corresponds to the position of an object is determined as the parallax of that object. In a case in which different parallaxes are stored at plural pixel positions within the region corresponding to the position of an object, the mean or the mode or the like of the parallaxes within that region can be determined as the parallax of that object.

By processings that are similar to those of the processings at the subject distance range adjusting section 43, the parallax range adjusting section judges whether or not the difference between the parallax range, that has been computed for the image of the previous frame, and the parallax range, that has been computed for the image of the current frame, exceeds a predetermined threshold value, and, if the difference exceeds the threshold value, the parallax range adjusting section adjusts the parallax range of the current frame such that the difference between the parallax range of the previous frame and the parallax range of the current frame becomes smaller.

On the basis of a predetermined relationship between parallax ranges and appropriate parallax amounts corresponding to the parallax ranges, the parallax amount computing section 44 computes the parallax amount of the current frame from the computed parallax range or the adjusted parallax range. As described above, the relationship between parallax amount and subject distance range is such that, if the subject distance range is small, the relative parallax between a farthest subject, that exists furthest from the compound-eye digital camera 1, and the nearest subject, that exists nearest, is small, and if the subject distance range is large, the relative parallax between the farthest subject and the nearest subject is large. Thus, in order to obtain stereoscopic images having an appropriate stereoscopic feel, the parallax amount is increased if the subject distance range is small, and the parallax amount is reduced if the subject distance range is large. Here, in a case in which the subject distance range is small, the parallax range also is small, and, in a case in which the subject distance is large, the parallax range also is large. Accordingly, the relationship between parallax range and parallax amount can be determined similarly to the relationship between subject distance range and parallax amount. For example, in a case in which the relationship between parallax range and parallax amount is determined such as shown in FIG. 7, it suffices to set the parallax range (pixels) on the horizontal axis.

Further, the above-described first through fourth embodiments can be executed by being combined appropriately. In a case in which the third embodiment and the fourth embodiment are combined, even if an object is an object whose amount of movement is large, if that object is a selected object, it can be made such that that object is not excluded. Further, even if an object is a selected object, if that object is an object whose amount of movement is large, it can be made such that the object is excluded.

Further, the above embodiments describe cases in which it is judged whether or not the difference between the subject distance range of the previous frame and the subject distance range of the current frame is large, and the subject distance range of the current frame is adjusted. However, the present invention is not limited to the same. Images of a predetermined number of frames may be acquired, and, after the subject distance range of each frame is computed, by comparing the subject distance range of a specific frame with the subject distance range of the frame that has been captured one after that specific frame, the necessity of adjusting the subject distance range of the specific frame may be judged.

Further, although the above embodiments describe cases of determining the parallax amount of the nearest subject, in a case in which selected objects are selected as in the fourth embodiment, the parallax amount of a selected object may be determined.

Further, although the present embodiments describe a compound-eye digital camera of a configuration equipped with two imaging sections, the present invention can be applied similarly also to cases of acquiring three or more images in a configuration that is equipped with three or more imaging sections. In this case, it suffices to carry out processings that are similar to those of the above-described embodiments by arbitrarily combining two images from among the plural images.

Further, the respective blocks shown in FIG. 3 may be configured by hardware, or the functions of the respective blocks may be configured so as to be realized by software, or may be configured by combinations of hardware and software. In the case of configuring by software, it is good to make the video image capturing processing routine of the present embodiment into a program and execute the program by a CPU. The program can be provided by being stored in a storage medium, or can be provided by being stored in a storage device such as a server or the like and downloaded via a network.

What is claimed is:

1. An imaging device comprising:
   a plurality of imaging units that continuously capture, one frame at a time, a same object of imaging from a plurality of different viewpoints respectively;
   a detecting unit that detects a subject from respective images of the frames captured by any one of the imaging units;
   a range computing unit that, in a case in which a plurality of subjects are detected by the detecting unit, computes values relating to distances between the respective detected subjects and the imaging units, and computes a range represented by a difference between a maximum value and a minimum value of the values;
   an adjusting unit that, in a case in which a difference between a range of a specific frame that has been computed by the range computing unit, and a range of a frame that has been captured one before or after the specific frame, exceeds a predetermined threshold value, adjusts the range of the specific frame such that the difference becomes smaller;
   a parallax amount computing unit that, on the basis of a predetermined relationship between ranges and parallax amounts corresponding to the ranges, computes a parallax amount that corresponds to the range computed by the range computing unit or the range adjusted by the adjusting unit; and
   a recording control unit that effects control so as to record the respective images of the frames captured by the respective imaging units, and the parallax amounts computed by the parallax amount computing unit, in correspondence with one another on a recording unit.

2. The imaging device of claim 1, wherein the values relating to the distances are made to be distances between the respective detected subjects and the imaging units, or respective parallaxes of the detected subjects.

3. The imaging device of claim 1, wherein, in a case in which a subject, that has been used in computing the range of the frame that has been captured one before or after, is not detected from the specific frame, the adjusting unit considers the difference between the range of the specific frame and the range of the frame that has been captured one before or after to have exceeded the predetermined threshold value, and adjusts the range of the specific frame.

4. The imaging device of claim 1, wherein the range computing unit computes an amount of movement between frames of the subject detected by the detecting unit, and computes the range by excluding a subject for which the amount of movement exceeds a predetermined amount of movement that is determined in advance.

5. The imaging device of claim 4, wherein the range computing unit excludes a subject for which a direction of movement of the subject is an optical axis direction of the imaging unit and for which the amount of movement exceeds the predetermined amount of movement that is determined in advance.

6. The imaging device of claim 1, comprising:
   a registering unit that registers in advance subjects detected by the detecting unit,
   wherein, in a case in which a subject that has been registered by the registering unit is detected by the detecting unit, the range computing unit computes the range by using the registered subject.

7. The imaging device of claim 4, comprising:
   a registering unit that registers in advance subjects detected by the detecting unit,
   wherein the range computing unit computes the range by excluding a subject for which the amount of movement exceeds the predetermined amount of movement that is determined in advance and that is a subject that is not registered by the registering unit.

8. The imaging device of claim 4, comprising:
   a registering unit that registers in advance subjects detected by the detecting unit,
   wherein, if a subject is a subject registered by the registering unit, even in cases in which the amount of movement exceeds the predetermined amount of movement that is determined in advance, the range computing unit does not exclude the subject from computation of the range.

9. The imaging device of claim 1, wherein, in a case in which a single subject is detected by the detecting unit, the parallax amount computing unit computes the parallax amount by using the subject as a crosspoint, and, in a case in which a subject is not detected by the detecting unit, the parallax amount computing unit computes the parallax amount by using a predetermined point, that is determined in advance, as the crosspoint.

10. An imaging method comprising:
- continuously capturing, one frame at a time, a same object of imaging from a plurality of different viewpoints respectively by a plurality of imaging units;
- detecting a subject from respective images of the frames captured by any one of the imaging units;
- in a case in which a plurality of subjects are detected, computing values relating to distances between the respective detected subjects and the imaging units, and computing a range represented by a difference between a maximum value and a minimum value of the values;
- in a case in which a difference between a computed range of a specific frame, and a range of a frame that has been captured one before or after the specific frame, exceeds a predetermined threshold value, adjusting the range of the specific frame such that the difference becomes smaller;
- on the basis of a predetermined relationship between ranges and parallax amounts corresponding to the ranges, computing a parallax amount that corresponds to the computed range or the adjusted range; and
- recording the respective images of the frames captured by the respective imaging units, and the computed parallax amounts, in correspondence with one another on a recording unit.

11. A non-transitory computer readable medium which stores a program for causing a computer to function as:
- an imaging control unit that respectively controls a plurality of imaging units to continuously capture, one frame at a time, a same object of imaging from a plurality of different viewpoints respectively;
- a detecting unit that detects a subject from respective images of the frames captured by any one of the imaging units;
- a range computing unit that, in a case in which a plurality of subjects are detected by the detecting unit, computes values relating to distances between the respective detected subjects and the imaging units, and computes a range represented by a difference between a maximum value and a minimum value of the values;
- an adjusting unit that, in a case in which a difference between a range of a specific frame that has been computed by the range computing unit, and a range of a frame that has been captured one before or after the specific frame, exceeds a predetermined threshold value, adjusts the range of the specific frame such that the difference becomes smaller;
- a parallax amount computing unit that, on the basis of a predetermined relationship between ranges and parallax amounts corresponding to the ranges, computes a parallax amount that corresponds to the range computed by the range computing unit or the range adjusted by the adjusting unit; and
- a recording control unit that effects control so as to record the respective images of the frames captured by the respective imaging units, and the parallax amounts computed by the parallax amount computing unit, in correspondence with one another on a recording unit.

* * * * *